(12) United States Patent
Wang

(10) Patent No.: US 6,403,724 B1
(45) Date of Patent: Jun. 11, 2002

(54) POLYMER GEL INCLUDING DENDRIMERS

(75) Inventor: Xiaorong Wang, Hudson, OH (US)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 09/873,673

(22) Filed: Jun. 4, 2001

(51) Int. Cl.[7] ..................... C08F 267/04; C08F 267/10

(52) U.S. Cl. ................... 525/285; 525/296; 525/331.1; 525/331.3; 525/332.7

(58) Field of Search ................................. 525/285, 296, 525/331.1, 331.3, 332.7

(56) References Cited

U.S. PATENT DOCUMENTS 6,177,414 B1 * 1/2001 Tomalia et al. ............. 514/159

* cited by examiner

*Primary Examiner*—James J. Seidleck
*Assistant Examiner*—Olga Asinovsky
(74) *Attorney, Agent, or Firm*—David G. Burleson; Scott A. McCollister

(57) ABSTRACT

A high damping polymer gel composition suitable for at least vibration damping application, including a copolymer with at least alkenyl monomer units and maleimide monomer units, a maleated polyalkylene, a crosslinking agent, and a dendrimer is provided. The polymer gel composition may further include an extender.

20 Claims, No Drawings

POLYMER GEL INCLUDING DENDRIMERS

BACKGROUND OF THE INVENTION

The present invention relates to high damping polymer compositions that have high-temperature stability, mechanical strength and moldability, and excellent tan δ values over a wide temperature range.

Two or more polymers may be blended together to form a wide variety of random or structured morphologies that can be used to provide products with potentially desirable combinations of characteristics. However, it may be difficult or even impossible in practice to achieve many potential combinations through simple blending because of some inherent and fundamental problems. Frequently, the polymers are thermodynamically immiscible, which precludes generating a truly homogeneous product. While immiscibility may not be a problem since it may be desirable to have a two-phase structure, the situation at the interface between these two phases very often leads to problems. The typical case is one of high interfacial tension and poor adhesion between the two phases. This interfacial tension contributes, along with high viscosities, to the inherent difficulty of imparting the desired degree of dispersion to random mixtures and to their subsequent lack of stability, giving rise to gross separation or stratification during later processing or use. Poor adhesion leads, in part, to the very weak and brittle mechanical behavior often observed in dispersed blends and may render some highly structure morphologies impossible.

Not-withstanding their recognized shortcomings, soft polymer compositions of two or more blended polymers are known in the art and have been considered useful in high damping applications. Such polymers are useful as cushions and vibration dampers, as well as other applications in which a degree of softness, heat resistance, elasticity, and good adhesion are desirable. Impeding to the use of soft polymers is their relatively poor high temperature stability and low hysteresis values.

One class of such soft polymers is centipede polymers. Centipede polymers have relatively long backbones with relatively short side chains. They are often formed by grafting the grafting of short polymer chains onto reactive sites in the long polymer chain. Additionally, centipede polymers can be extended to form a gel. Examples of such centipede polymers include polypropylene grafted poly(alkenyl-co-maleimide) polymer compositions. Specifically, this class of centipede polymers includes polypropylene grafted poly(alkenyl benzene-co-maleimide) compositions, polypropylene grafted poly($R^1R^2$ethylene-co-maleimide) compositions, and polypropylene grafted poly(alkyl vinyl ether-co-maleimide) compositions. Centipede polymers of this type have been used in high damping materials, but still suffer from the aforementioned relatively low hysteresis values.

Dendrimers, also known as cascade polymers, are discrete, highly branched, monodispersed polymers that possess branching patterns reminiscent of trees and are readily described by mathematical progression. Dendrimers have three-dimensional globular structures. The most common class of dendrimers is radial, or starburst, dendrimers, which possess a radially symmetrical star-shaped architecture involving successive cascades of branched polymer structures.

Dendrimers have been used as crosslinkers due to their high functionality. Furthermore, that functionality may be highly controlled, with groupings of desirable functional groups on one or more segments of the dendrimer structure. Moreover, the identity of the functional groups may be varied throughout the molecule. Dendrimers are known for their ability to form gels as they become larger.

Providing a polymer composition that combines the beneficial properties of soft polymers and dendrimers remains desirable. Particularly desirable improved damping abilities.

SUMMARY OF THE INVENTION

The present invention provides a polymer composition including at least a monomer selected from a vinyl-substituted aromatic hydrocarbon, a $R^1R^2$ethylene, an alkyl vinyl ether, and a maleimide; a dendrimer; a maleated polyalkylene; a crosslinking agent; and, optionally, an extender. This composition demonstrates excellent tensile strength, tear strength, damping properties, high-temperature compression set, and hysteresis values.

According to one embodiment of the invention, the polymer composition includes a centipede polymer of (alkenyl-co-maleimide), maleated polyalkylene, and a dendrimer. The alkenyl monomer units in the centipede polymers can be a vinyl-substituted aromatic hydrocarbon, a $R^1R^2$ethylene, and/or an alkyl vinyl ether.

The following definitions apply herein throughout unless a contrary intention is expressly indicated:

"vinyl aromatic hydrocarbon" and "alkenyl benzene" are used interchangeably;

"maleic anhydride" encompasses dicarboxylic acids, including maleic anhydride, which can form a copolymer with an alkenyl benzene, an $R^1R^2$ethylene, or an alkyl vinyl ether, the copolymer having dicarboxylic acid units which are capable of reaction with an amine functional group;

"maleimide" encompasses the reaction product of an amine and the dicarboxylic acids described above;

"$R^1R^2$ethylene" encompasses compounds of the general formula:

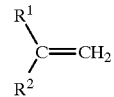

where $R^1$ and $R^2$ are the same or different substituents and are independently hydrogen or substituted $C_1$–$C_{20}$ alkyl groups;

"poly(alkenyl-co-maleimide)" includes poly(alkenylbenzene-co-maleimide), poly($R^1R^2$ethylene-co-maleimide), and poly(alkyl vinyl ether-co-maleimide).

DETAILED DESCRIPTION OF ILLUSTRATIVE EMBODIMENTS

The polymer composition of the present invention includes a centipede polymer and a dendrimer. Preferably, the centipede polymer contains (a) at least two monomer units such as (i) an alkenyl unit chosen from vinyl-substituted aromatic hydrocarbons, $R^1R^2$ethylenes, and alkyl vinyl ethers, and (ii) a maelemide, and (b) maleated polyalkylenes. The composition preferably further includes a crosslinking agent and an extender.

The centipede polymer can be formed by imidizing a poly(alkenyl-co-maleic anhydride) with a mono-primary amine. The centipede polymer has a high molecular weight spine with many relatively short side chains formed from the amines. The length of the main chain usually is at least as long as the entanglement length, which is herein defined theoretically as an order of magnitude of 100 repeating units, while the length of the side chains is less than the entanglement length.

Poly(alkenyl-co-maleimide) and poly(alkenyl-co-maleic anhydride) encompass random and stereospecific copolymers, including copolymers having a backbone with alkenyl-contributed units (i.e., monomer units derived from an alkenyl benzene such as styrene) and maleimide- or maleic anhydride-contributed units (i.e., monomer units derived from a maleimide or a maleic anhydride). Such structures may be alternating and are typically are described as poly(alkenyl-alt-maleimide) and poly(alkenylalt-maleic anhydride); however, these polymers are encompassed within the terms poly(alkenyl-co-maleimide) and poly (alkenyl-co-maleic anhydride). Exemplary copolymers include copolymers with a ratio of about 50% alkenyl contributed monomer units and about 50% maleimide contributed monomer units. However, copolymers with a ratio of at least about 20% alkenyl contributed monomer units are contemplated for use.

Preferred alkenyl benzene contributed monomer units of the poly(alkenyl benzene-co-maleimide) centipede are derived from one or more of styrene, α-methylstyrene, 1-vinyl-naphthalene, 2-vinyl-naphthalene, 1-α-methyl vinyl naphthalene, 2-α-methyl naphthalene, as well as alkyl, cycloalkyl, aryl, alkaryl, and aralkyl derivatives thereof, in which the total number of carbon atoms in the combined hydrocarbon is not greater than about 18, as well as any di- or tri-vinyl aromatic hydrocarbons. Preferred vinyl aromatic hydrocarbons include styrene and a-methyl styrene.

Preferred $R^1$ and $R^2$ groups of $R^1R^2$ethylene contributed monomer units and the alkyl groups of said alkyl vinyl ether contributed monomer units are independently selected from methyl, ethyl, propyl, isopropyl, butyl, isobutyl, pentyl, isopentyl, hexyl, heptyl, octyl, nonyl, decyl, undecyl, dodecyl, tredecyl, tetradecyl, pentadecyl, hexadecyl, heptadecyl, octadecyl, nonadecyl, eicosyl, cyclopropyl, 2,2-dimethylcyclopropyl, cyclopentyl, cyclohexyl, methoxymethyl, methoxyethyl, methoxypropyl, methoxybutyl, methoxypentyl, methoxyhexyl, methoxyoctyl, methoxynonyl, ethoxydecyl, ethoxymethyl, ethoxyethyl, ethoxypropyl, ethoxybytyl, ethoxypentyl, ethoxyhexyl, ethoxyheptyl, ethoxyoctyl, ethoxynonyl, ethoxydecyl, propoxymethyl, propoxyethyl, propoxypropyl, propoxybutyl, propoxypentyl, propoxyheptyl, propoxyoctyl, propoxynonyl, propoxydecyl, butoxymethyl, butoxyethyl, butoxypropoyl, butoxybutyl, butoxypentyl, butoxyhexyl, butoxygeptyl, butoxyoctyl, butoxynonyl, butoxydecyl, pentyloxymethyl, pentyloxyethyl, pentyloxypropyl, pentyloxybutyl, pentyloxypentyl, pentyloxyhexyl, pentyloxyoctyl, pentyloxynonyl, pentyloxydecyl, hexyloxymethyl, hexyloxyethyl, hexyloxypropyl, hexyloxybutyl, hexyloxypentyl, hexyloxyhexyl, hexyloxyheptyl, hexyloxyoctyl, hexyloxynonyl, hexyloxydecyl, heptyloxymethyl, heptyloxyethyl, heptyloxypropyl, heptyloxybutyl, hexyloxypentyl, heptyloxyhexyl, heptyloxyheptyl, heptyloxyoctyl, heptyloxynonyl, heptyloxydecyl, octyloxymethyl, octyloxyethyl, octyloxypropyl, octyloxybutyl, octyloxypentyl, octyloxyhexyl, octyloxyheptyl, octyloxyoctyl, octyloxynonyl, decyloxymethyl, decyloxyethyl, decyloxypropyl, decyloxybutyl, decyloxypentyl, decyloxyhexyl, decyloxyheptyl, 1-methylethyl, 1-methylpropyl, 1-methylbutyl, 1-methylpentyl, 1-methylhexyl, 1-methylheptyl, 1-methyloctyl, 1-methylnonyl, 1-methyidecyl, 2-methylpropyl, 2-methylbutyl, 2-bethylpentyl, 2-methylhexyl, 2-methylheptyl, 2-methyloctyl, 2,3,3-trimethylbutyl, 3-methylpentyl, 2,3-dimethylpentyl, 2,4-dimethylpentyl, 2,3,3,4-tetramethylpentyl, 3-methylhexyl, or 2,5-dimethylhexyl.

Preferred $R^1R^2$ethylene contributed monomer units of the poly($R^1R^2$ethylene-co-maleimide) include any alkene such as ethylene, propylene, butylene, isobutylene, pentene, hexene, heptene, etc., as well as any di- or tri- alkene, or mixtures thereof, with preference given to isobutylene.

Preferred alkyl vinyl ether contributed monomer units of the poly(alkyl vinyl ether-co-maleimide) include any alkyl vinyl ether such as methyl vinyl ether, ethyl vinyl ether, propyl vinyl ether, butyl vinyl ether, and any other alkyl vinyl ether wherein the number of carbons in the alkyl substituent is not greater than about 12, and mixtures thereof A preferred alkyl vinyl ether is methylvinyl ether.

The poly(alkenyl-co-maleimide) can be formed by reacting a poly(alkenyl-co-maleic anhydride) in the presence of ammonia and/or a mono-primary amine at temperatures from about 100° to about 300° C. and at a pressure from about slightly above vacuum to about 2026 kPa, under substantially dry conditions. The reactants are preferably dry mixed in the absence of solvents in a suitable mixing apparatus such as a Brabender mixer. Purging the mixer with $N_2$ prior to charging of the reactants can be preferred. The primary amine may be added in a single charge or in sequential partial charges into the reactor containing a charge of poly(alkenyl-co-maleic anhydride). Preferably, the primary amine is charged in ratio between 0.8 to 1.0 moles of amine per monomer contributed units of maleic anhydride in the poly(alkenyl-co-maleic anhydride).

Suitable primary amines include but are not limited to alkyl amines; alkyl benzyl amines; alkyl phenyl amines; alkoxybenzyl amines; allyl aminobenzoates; alkoxy aniline; and other linear primary amines containing from 1 to 50 carbon atoms, preferably 6 to 30 carbon atoms in the alkyl and alkoxy substituents in these primary amines. The alkyl and alkoxy substituents of the primary amines can be linear or branched, preferably linear, and saturated or unsaturated, preferably saturated. Exemplary amines include hexylamine, octylamine, and dodecylamine.

The poly(alkenyl-co-maleimide) prior to grafting with maleated polyalkylene, preferably has a weight-average molecular weight ($M_w$) between about 10,000 and 500,000, more preferably between about 150,000 and 450,000.

The centipede polymer may be prepared by any means known in the art for combining such ingredients, such as blending, milling, or internal batch mixing. A rapid and convenient method of preparation involves heating a mixture of components to a temperature of about 50° to 290° C.

The centipede polymers are preferably manufactured by mixing and dynamically heat-treating the components described above, namely, by melt-mixing. As for the mixing equipment, any conventional, generally known equipment such as an open-type mixing roll, closed-type Banbury mixer, closed-type Brabender mixer, extruding machine, kneader, continuous mixer, etc., is acceptable. The closed-type Brabender mixer is preferred, as is mixing in an inactive gas environment such as $N_2$ or Ar.

The poly(alkenyl-co-maleimides) described herein are subsequently graft-reacted through a difunctional linking or grafting agent to a maleated polyalkylene to yield a maleated polymer having at least one polyalkylene segment grafted thereto through at least one functional linkage. The alkylene contributed monomer units of the polyalkylene can be derived from ethylene, propylene, and/or butylene. A preferred polyalkylene is polypropylene.

The maleated polyalkylene may be any polyalkylene that has been maleated by methods known in the art. The polyalkylene grafted segment or segments preferably have a $M_w$ of about 10,000 to about 10,000,000 or higher, preferably about 20,000 to about 300,000. The crystallinity, or tacticity, of the polyalkylene may vary from being substantially amorphous to being completely crystalline, that is from about 10-100% crystallinity.

Because of the extensive commercial use of isotactic polypropylene, the grafted polypropylene often will be substantially crystalline, e.g., having a crystallinity greater than about 90%. Generally, the polypropylene is substantially free of ethylene. However, under certain circumstances small amounts of ethylene, on the order of less than about 10% by weight, may be incorporated. Furthermore, in certain instances, the polypropylene contains small amounts of ethylene in copolymers known as "reactor copolymers." Thus, the grafted polypropylenes can contain minor amounts of ethylene, both as part of the ethylene-propylene segments and as polyethylene segments.

The maleated polyalkylene contains from about 0.01 wt. % to about 5 wt. % (based on the weight of the maleated polyalkylene) incorporated maleic anhydride. The maleic anhydride content preferably is from about 0.01 to about 2 wt. %, most preferably about 0.03 to about 0.2 wt. %. The amount of residual maleic anhydride in the polymer preferably is kept low so that the subsequent reaction of the poly(alkenyl-co-maleimide) with the maleated polyalkylene is not detrimentally affected.

Grafting of the maleated polyalkylene and the poly (alkenyl-co-maleimide) can be performed by adding a grafting agent to the reaction mixture containing the centipede polymer and maleated polyalkylene. Preferred grafting agents include low molecular weight organic compounds with at least 2 functional groups capable of crosslinking the polymer. Appropriate functional groups include primary amine, secondary amine, carboxyl, formyl, and hydroxyl. A preferred grafting agent is a polyamine, preferably an organic diamine. The grafting agent is added to a blend of maleated polyalkylene and poly(alkenyl-co-maleimide) to partially cross-link the polyalkylene to the poly(alkenyl-co-maleimide) through the maleate functional groups.

Suitable organic diamines or diamine mixtures containing two aliphatically or cycloaliphatically bound primary amino groups are used as grafting agents. Such diamines include, for example, aliphatic or cycloallphatic diamines corresponding to the formula $R^3(NH_2)_2$, wherein $R^3$ represents a $C_2$–$C_{20}$ aliphatic hydrocarbon group, a $C_4$–$C_{20}$ cycloaliphatic hydrocarbon group, a $C_6$–$C_{20}$ aromatic hydrocarbon group, or a $C_4$–$C_{20}$ N-heterocyclic ring, e.g., ethylenediamine, 1,2- and 1,3-propylene diamine, 1,4-diaminobutane; 2,2-dimethyl- 1,3-diaminopropane; 1,6-diaminohexane; 2,5-dimethyl-2,5-diaminohexane; 1,6-diaminoundecane; 1,12- diaminododecane; 1-methyl-4-(aminoisopropyl)-cyclohexylamine; 3-aminomethyl-3,5,5-trimethyl-cyclohexylamine; 1,2-bis-(aminomethyl)-cyclobutane; 1,2-diamino-3,6-dimethylbenzene; 1,2- and 1,4-diaminocyclohexane; 1,2-, 1,4-, 1,5-, and 1,8-diaminodecalin; 1-methyl-4-aminoisopropyl-cyclohexylamine; 4,4'-diamino-dicyclohexyl methane; 2,2'-(bis-4-amino-cyclohexyl)-propane; 3,3'-dimethyl-4,4'-diaminodicyclohexyl methane; 1,2-bis-(4-aminocyclohexyl)-ethane; 3,3',5,5'-tetramethyl-bis-(4-aminocyclohexyl)-methane and -propane; 1,4-bis-(2-aminoethyl)-benzene; benzidine; 4,4'-thiodianiline; 3,3'-dimethoxybenzidine; 2,4-diaminotoluene; diaminoditolylsulfone; 2,6-diaminopyridine; 4-methoxy-6-methyl-m-phenylenediamine; diaminodiphenyl ether; 4,4'-bis(o-toluidine); o-phenylenediamine; methylene bis(o-chloroaniline); bis(3,4-diaminophenyl) sulfone; diaminophenylsulfone; 4-chloro-o-phenylenediamine; m-aminobenzyl amine; m-phenylene diamine; 4,4'-$C_1$–$C^6$-dianiline; 4,4'-methylene-dianiline; aniline-formaldehyde resin; trimethylene glycol-di-p-aminobenzoate; bis-(2-aminoethyl)-amine, bis-(3-aminopropyl) amine; bis-(4-aminobutyl)amine; bis-(6-aminohexyl)-amine, and isomeric mixtures of dipropylene triamine and dibutylene triamine. Mixtures of these diamines (or other grafting agent) may also be used.

Other suitable polyamines for use as grafting agents include bis-(aminoalkyl)amines, preferably those having a total of from 4 to 12 carbon atoms such as bis-(2-aminoethyl) amine, bis-(3-aminopropyl) amine, bis-(4-aminobutyl) amine, and isomeric mixtures of dipropylene triamine and dibutylene triamine. Hexamethyl diamine, tetramethylene diamine, and especially 1,12-diaminododecane are preferred.

The polymers of the present invention may include an extender. The extender addition can be performed before or after the dendrimer blending discussed below. Suitable extenders include extender oils and low molecular weight compounds or components, such as, but not limited to naphthenic, aromatic, paraffinic, phthalic, and silicone oils. A preferred extender is a paraffinic oil. The final polymer compositions can contain between about 10 and 50%, preferably about 25 and 40%, oil and are thermoreversible elastomers.

The centipede polymer is mixed with a dendrimer to improve the damping properties of the polymer gel composition. Preferred dendrimers for use in the present invention include those with terminal amine, hydroxyl, or carboxyl groups. Dendrimers may have any dendritic structure, including starbranch oligomers, branch cells, network cells, radial dendrimers, radial dendrimer dimers, and looped micronetwork dimers. Particularly preferred are dendrimers with a radial structure.

Radial dendrimers have classic dendritic networks which can be seen as the product of growth from a point of initation. Radial polymers having a multiplicity of 3 are particularly preferred. STARBURST™ polymers of any generation (Aldrich Chem. Co., Milwaukee, Wis.) are contemplated for use in the present invention. The dendritic structure below is a third generation STARBURST™ polymer with 32 terminal amine groups. Preferred STARBURST™ polymers include amine terminated generations 1, 2, 3, 4, hydroxyl terminated generations 1, 2, 3, 4, and carboxyl terminated generations 0.5, 1.5, 2.5, 3.5, and 4.5. Each dendrimer generation represents one layer of concentric growth from the dendrimer core. As illustrated in the dendritic structure below, generation 0 represents the monomer units attached to the dendrimer core; generation 1 represents a layer of monomer units which have been concentrically attached to the branch points of generation 0; generation 2 represents a layer of monomer units which have been attached to the branch points of generation 1, and so on. Generations such as 0.5, 1.5, etc., represent points of attachment, such as carboxyl groups, where the attachment is linear with no branching.

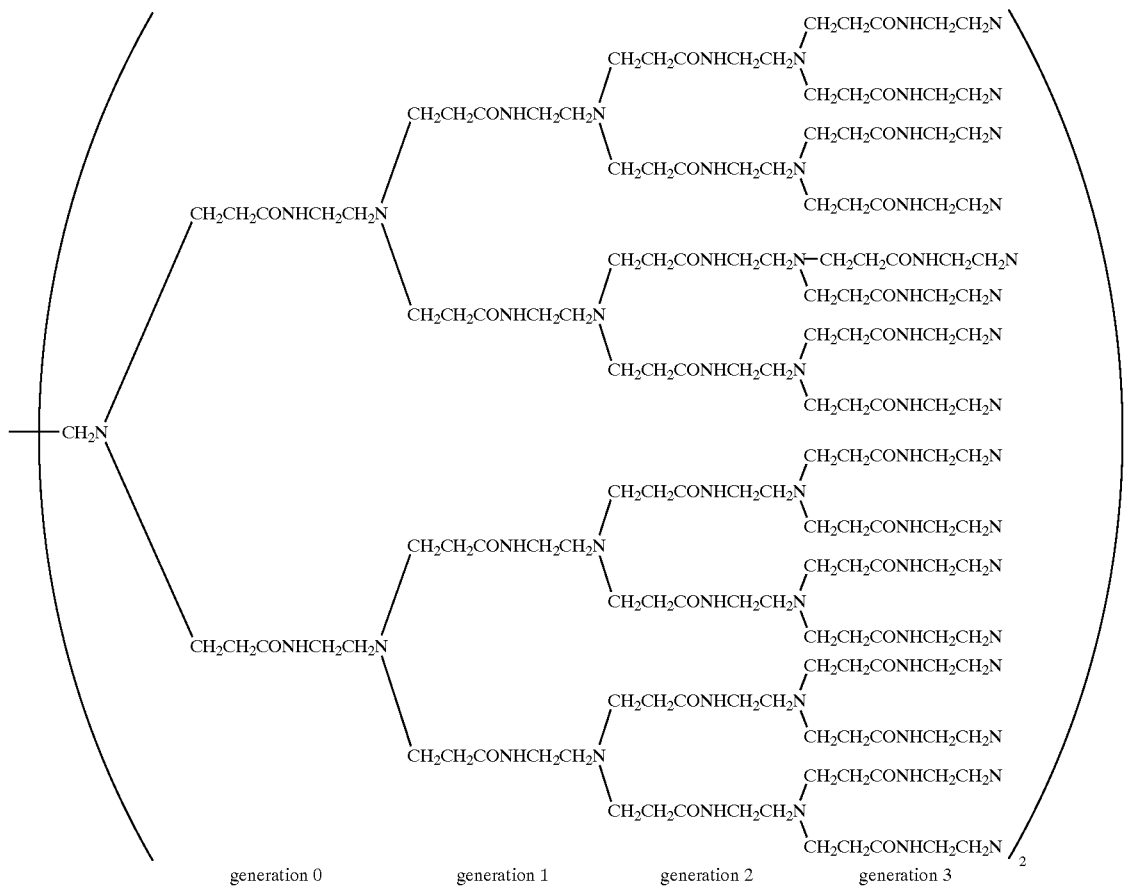

generation 0　　generation 1　　generation 2　　generation 3

The dendrimer(s) may be blended with the polymer gel composition by mixing and dynamically heat-treating the components described above, namely, by melt-mixing. As for the mixing equipment, any conventional, generally known equipment such as an open-type mixing roll, open-type Banbury mixer, closed-type Banbury mixer, closed-type Brabender mixer, extruding machine, kneader, or continuous mixer is acceptable. The closed-type Brabender mixer is preferable, and mixing in an inactive gas environment, such as $N_2$ or Ar, is preferable.

The resultant centipede copolymer-dendrimer blend contains between about 1–99%, preferably between about 20–90%, and most preferably about 30–90% by weight centipede copolymer. The composition preferably contains between about 1 and 40%, preferably between about 5 and 30%, and most preferably between about 10 and 25% by weight dendrimer. The composition may also contain between about 1 and 50%, more preferably between about 10 and 40%, most preferably between about 15 and 40% by weight extender. In addition, stabilizers, antioxidants, reinforcing agents, reinforcing resins, pigments, and fragrances are examples of additives which can also be utilized in the present invention.

The polymer composition demonstrates a compression set at 100° C. less than 50%, more preferably less than 40%. The tensile strength of the polymer composition at break is preferably in excess of about 300 kPa, more preferably in excess of about 325 kPa. The Shore A values that measure damping properties are preferably greater than about 5. Hysteresis values, measured as tan δ at 20° C. are preferably greater than about 0.4, more preferably greater than about 0.55.

The composition of the present invention is favorably used in the manufacturing of any product in which the following properties are advantageous: a degree of softness, heat resistance, decent mechanical properties, elasticity, good adhesion, and/or high damping. The compositions of the present invention can be used in, for example, the fabrication of automotive parts, household electrical appliances, industrial machinery, precision instruments, transport machinery, constructions, engineering, medical instruments, and tire rubber formulations.

Representative uses include the fabrication of damping materials and vibration restraining materials. These uses involve connecting materials such as sealing materials, packing, gaskets, and grommets; supporting materials such as mounts, holders, and insulators, and cushion materials such as stoppers, cushions, and bumpers. These materials are also used in equipment producing vibration or noise and household electrical appliances, such as in air-conditioners, laundry machines, refrigerators, electric fans, vacuums, dryers, printers, and ventilator fans. These materials are also suitable as impact absorbers in audio equipment and electronic or electrical equipment, sporting goods, and shoes.

The present invention is described in more detail in the following non-limiting examples. These are presented for purposes of illustration only, and are not to be construed in a limiting sense.

EXAMPLES

Example 1

To a 6 L kneader-extruder (MXE-6) equipped with sigma blades was added 1.252 kg Isoban-10™ poly(maleic anhydride-alt-isobutylene) (Kuraray Co., Tokyo, Japan), and 0.989 kg octylamine (BASF, Ludwigshafen, Germany) at 54° C. Mixing was started with a blade speed of 25 rpm and screw speed of 40 rpm for 5 minutes, and then the temperature of the mixer was adjusted to rise to 190° C. at a rate of about 3° C./minute. Mixing was continued for 2 more hours isothermally at 190° C.

Then, 0.562 kg PO1015™ maleated polypropylene (Exxon Chemicals; Houston, Tex.) was added to the mixer. Mixing was continued for another 30 minutes, followed by addition of 23 g dodecane diamine (Aldrich). After 15 minutes, 1.397 kg di(tridecyl)pthalate (DTDP) oil (C.P. Hall Co.) was added and the temperature was adjusted to 160° C. After another 2 hours, the final product was then extruded through a ¼ inch (0.63 cm) die.

The final product contained 33% DTDP oil and was a thermoreversible elastomer.

Example 2

A charge of 30 g of the product of Example 1 was added to a Brabender mixer (50 g capacity) equipped with a roller blade and $N_2$ purging. The mixer was initially set to 160° C. and 60 rpm. After 4 minutes, 4 g STARBURST™ 4 and 1.4 g STARBURST™ 3 dendrimers (both from Aldrich) were added to the mixer. The material was further mixed at those conditions for 6 minutes; then, the agitation was stopped and the mixture removed from the mixer.

Example 3

To a Brabender mixer equipped with a roller blade and $N_2$ purging, 25 g of the product of Example 2 was added. The mixer was initially set to 160° C. and 60 rpm. After 3 minutes, a charge of 20 g DTDP oil was slowly added to the mixer. The material was further mixed at those conditions for 5 minutes, then agitation was stopped and the mixture removed from the mixer.

Example 4

The procedure of Example 2 was repeated except for a minor change in the charges of the materials. To the mixer was added 30 g of the product of Example 1, 5.0 g STARBURST™ 4 dendrimer, 5.0 g STARBURST™ 3 dendrimer, and 5 g STARBURST™ 2 dendrimer. The total mixing time was 10 minutes.

Example 5 (Comparative)

To a Brabender mixer, 25 g of the product of Example 1 was added. The mixer was initially set to 160° C. and 60 rpm. After 3 minutes, 20 g DTDP oil was slowly added. The material was further mixed at those conditions for 5 minutes; then, the agitation was turned off and the mixture was removed from the mixer.

These products were molded into sheets and cylinder buttons at ~160° C. Ring samples were cut from these sheets for tensile measurements. The physical properties of the final materials are listed in Table 1. In the table, G2 is STARBURST™ 2 dendrimer, G3 is STARBURST™ 3 dendrimer, and G4 is STARBURST™ 4 dendrimer.

TABLE 1

| | Ratio of G2/G3/G4 | C.S. @ 100° C. | Tb kPa | Eb % | Shore A | tan δ @ 20° C. |
|---|---|---|---|---|---|---|
| 2 | 0/4/1.4 | 58.1% | 2943 | 317 | 25 | 0.60 |
| 3 | 0/4/1.4 | 60.8% | 358 | 214 | 6 | 0.64 |
| 4 | 5/5/5 | 57.3% | 427 | 315 | 15 | 0.72 |
| 5 (comp) | 0/0/0 | 54.1% | 290 | 235 | 5 | 0.45 |

As can be seen in the Table above, the products were soft, thermoreversible gels. The centipede copolymer-dendritic polymers (examples 2–4) exhibited better damping properties than the centipede copolymer gel alone (example 5). Finally, all materials shown in the Table above were thermally recyclable at 160° C.

The invention has been described with reference to certain preferred embodiments. Modifications can be made without departing from the scope and spirit of the invention as defined in the appended claims.

I claim:

1. A polymer composition comprising:
    a. a polymer comprising monomer units selected from one or more of a vinyl-substituted aromatic hydrocarbon, a $R^1R^2$ethylene, and an alkyl vinyl ether, and maleimide monomer units,
    b. a maleated polyalkylene,
    c. at least one dendrimer, and
    d. optionally, an extender.
2. The composition of claim 1 wherein said vinyl-substituted aromatic hydrocarbon is chosen from any one or combination of styrene, α-methylstyrene, 1-vinyinaphthalene, 2-vinylnaphthalene, 1-α-methylvinylnaphthalene, 2-α-methylvinylnaphthalene, as well as alkyl, cycloalkyl, aryl, alkaryl, and aralkyl derivatives thereof, in which the total number of carbon atoms in the combined hydrocarbon is not greater than about 18, as well as any di- or tri-vinyl-substituted aromatic hydrocarbons.
3. The composition of claim 1 wherein said vinyl-substituted aromatic hydrocarbon monomer units comprise styrene.
4. The composition of claim 1 wherein the $R^1R^2$ of said $R^1R^2$ethylene contributed monomer units and the alkyl of said alkyl vinyl ether contributed monomer units are independently selected from methyl, ethyl, propyl, isopropyl, butyl, isobutyl, pentyl, isopentyl, hexyl, heptyl, octyl, nonyl, decyl, undecyl, dodecyl, tredecyl, tetradecyl, pentadecyl, hexadecyl, heptadecyl, octadecyl, nonadecyl, eicosyl, cyclopropyl, 2,2-demethylcyclopropyl, cyclopentyl, cyclohexyl, methoxymethyl, methoxyethyl, methoxypropyl, methoxybutyl, methoxypentyl, methoxyhexyl, methoxyoctyl, methoxynonyl, ethoxydecyl, ethoxymethyl, ethoxyethyl, ethoxypropyl, ethoxybytyl, ethoxypentyl, ethoxyhexyl, ethoxyheptyl, ethoxyoctyl, ethoxynonyl, ethoxydecyl, propoxymethyl, propoxyethyl, propoxypropyl, propoxybutyl, propoxypentyl, propoxyheptyl, propoxyoctyl, propoxynonyl, propoxydecyl, butoxymethyl, butoxyethyl, butoxypropoyl, butoxybutyl, butoxypentyl, butoxyhexyl, butoxygeptyl, butoxyoctyl, butoxynonyl, butoxydecyl, pentyloxymethyl, pentyloxyethyl, pentyloxypropyl, pentyloxybutyl, pentyloxypentyl, pentyloxyhexyl, pentyloxyoctyl, pentyloxynonyl, pentyloxydecyl, hexyloxymethyl, hexyloxyethyl, hexyloxypropyl, hexyloxybutyl, hexyloxypentyl, hexyloxyhexyl, hexyloxyheptyl, hexyloxyoctyl, hexyloxynonyl, hexyloxydecyl, heptyloxymethyl, heptyloxyethyl, heptyloxypropyl, heptyloxybutyl, hexyloxypentyl, heptyloxyhexyl, heptyloxyheptyl, heptyloxyoctyl, heptyloxynonyl, heptyloxydecyl, octyloxymethyl, octyloxyethyl, octyloxypropyl, octyloxybutyl, octyloxypentyl, octyloxyhexyl, octyloxyheptyl, octyloxyoctyl, octyloxynonyl, decyloxymethyl, decyloxyethyl, decyloxypropyl, decyloxybutyl, decyloxypentyl, decyloxyhexyl, decyloxyheptyl, 1-methylethyl, 1-methylpropyl, 1-methylbutyl, 1-methylpentyl, 1-methylhexyl, 1-methylheptyl, 1-methyloctyl, 1-methylnonyl, 1-methyldecyl, 2-methylpropyl, 2-methylbutyl, 2-bethylpentyl, 2-methylhexyl, 2-methylheptyl, 2-methyloctyl, 2,3,3-trimethylbutyl, 3-methylpentyl, 2,3-dimethylpentyl, 2,4-dimethylpentyl, 2,3,3,4-tetramethylpentyl, 3-methylhexyl, or 2,5-dimethylhexyl.

5. The composition of claim 1 wherein said maleimide is the reaction product of maleic anhydride and at least a primary amine.

6. The composition of claim 5 wherein said primary amine is at least one of alkyl amines, alkyl benzyl amines, alkyl phenyl amines, alkoxybenzyl amines, alkyl aminobenzoates, and alkoxy aniline, containing from 1 to about 50 carbon atoms in the alkyl and alkoxy substituents in the primary amine.

7. The composition of claim 1 wherein alkylene contributed monomer units of said maleated polyalkylene comprise at least one of ethylene, propylene, and butylene.

8. The composition of claim 1 further comprising a grafting agent selected from a low molecular weight organic compound having 2 or more functional groups, at least one functional group capable of reacting with an unreacted maleic anhydride monomer unit in the centipede polymer and at least one functional group being capable of reacting with a carboxylic acid group in said maleated polyalkylene.

9. The composition of claim 8 wherein said functional groups are one or more of primary amines, secondary amines, vinyl, alkynyl, carboxyl, formyl, halo, and hydroxyl groups.

10. The composition of claim 8 wherein said grafting agent is a diamine.

11. The composition of claim 10 wherein said diamine comprises an aliphatic or cycloaliphatic diamine corresponding to the general fromula $R^3(NH_2)_2$, wherein $R^3$ represents one of the group consisting of $C_2$–$C_{20}$ aliphatic hydrocarbon groups, $C_4$–$C_{20}$ cycloaliphatic groups, and $C_4$–$C_{20}$ N-heterocyclic rings.

12. The composition of claim 1 wherein said dendrimer is at least a first generation dendrimer.

13. The composition of claim 1 wherein said dendrimer has terminal groups comprising at least one of amino, hydroxyl, or carboxyl groups.

14. The composition of claim 1 wherein said dendrimer is a radial dendrimer.

15. The composition of claim 1 wherein said dendrimer is a $2^{nd}$, $3^{rd}$, and/or $4^{th}$ generation dendrimer.

16. The composition of claim 1 further comprising at least two dendrimers of different generations.

17. A method for forming a polymer blend comprising combining:
  a. poly(alkenyl-co-maleimide) compound of a maleimide and at least one of
    i. vinyl-substituted aromatic hydrocarbon,
    ii. $R^1R^2$ethylene, in which $R^1$ and $R^2$ independently are hydrogen or substituted or unsubstituted $C_1$ to $C_{20}$alkyl groups having from 1 to 40 carbon atoms, and
    iii. alkyl vinyl ether, wherein the alkyl group is linear or branched, substituted or unsubstituted, having from 1 to about 40 carbon atoms;
  b. a maleated polyalkylene,
  c. a grafting agent to form a maleated polyalkylene grafted poly(alkenyl-co-maleimide);
  d. a dendrimer; and
  e. optionally, an extender.

18. The method of claim 17 wherein said dendrimer is a radial dendrimer.

19. The method of claim 17 wherein said dendrimer has terminal groups comprising at least one of amino, hydroxyl, or carboxyl groups.

20. The method of claim 17 wherein said maleimide is the reaction product of maleic anhydride and at least a primary amine.

* * * * *